Patented Dec. 27, 1949

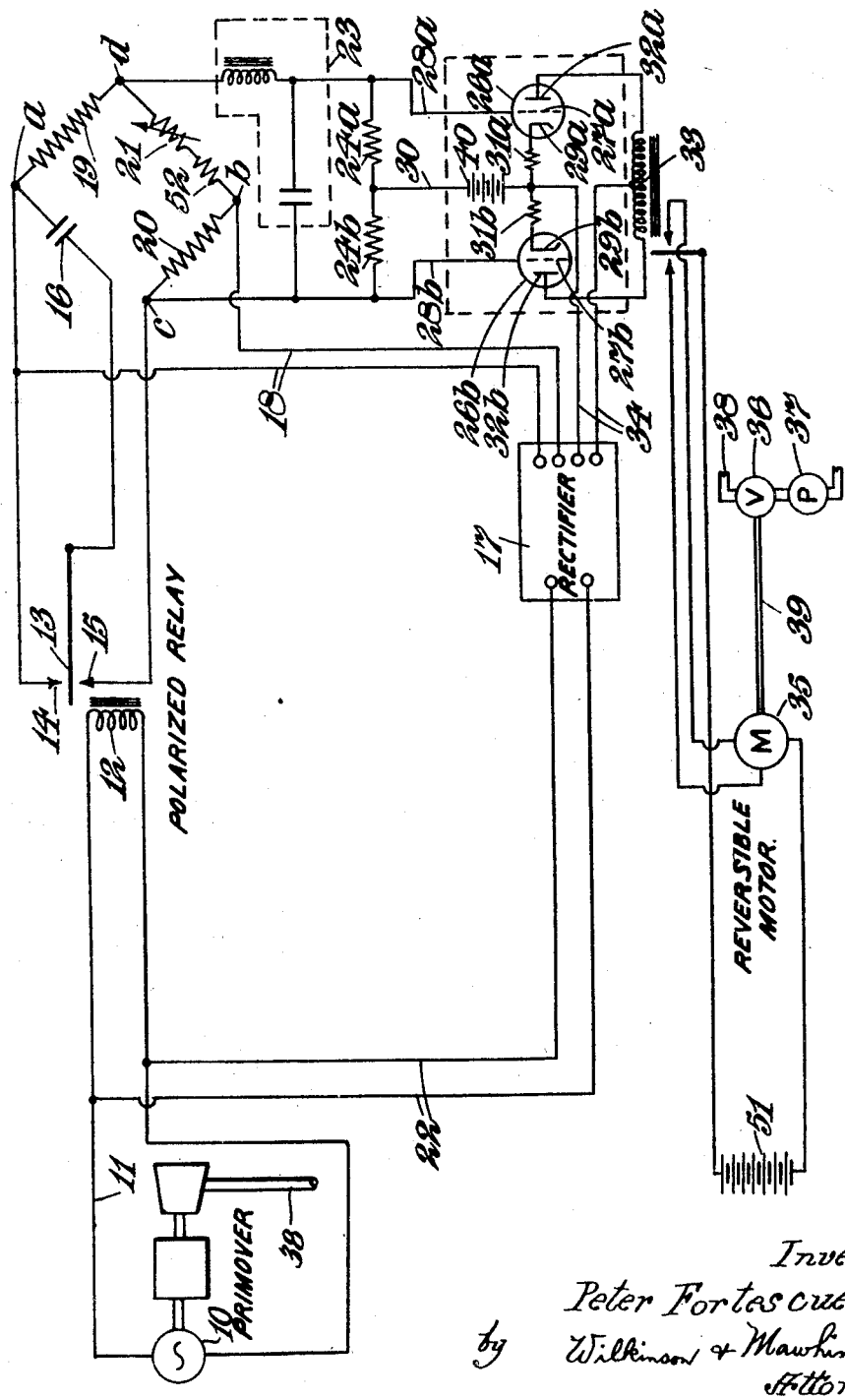

2,492,472

UNITED STATES PATENT OFFICE 2,492,472

SPEED RESPONSIVE CONTROL SYSTEM

Peter Fortescue, Bristol, England, assignor to The Bristol Aeroplane Company Limited, Bristol, England, a British company Application September 13, 1945, Serial No. 616,030
In Great Britain July 3, 1944

Section 1, Public Law 690, August 8, 1946
Patent expires July 3, 1964

2 Claims. (Cl. 60—41)

This invention concerns improvements in or relating to speed governing or temperature regulating.

It is desirable to govern the speed of certain apparatus with great precision by means which is unaffected by changes in the intrinsic characteristics of the components since this obviates the necessity of periodically making compensating adjustments.

It is an object of the present invention to provide speed governing means that satisfies these requirements.

The present invention makes use of a known method for accurately determining the capacity of a condenser which is due to Clerk Maxwell. The condenser whose capacity is to be measured is substituted for one arm of a Wheatstone bridge-network. A commutator is also connected in this arm by means of which the condenser is alternately charged and discharged. The commutator is driven by an electric motor, supplied from a steady source, and whose speed can be varied as required. The charging current is applied to the bridge-network from a battery in the same way as for a Wheatstone bridge.

With this arrangement the galvanometer is affected by a constant current which flows along the galvanometer branch in one direction and by a series of current impulses which flow along the branch in the opposite direction. These pulsations are produced in the network by the condenser being alternately charged and discharged. When the bridge-network is balanced, the steady current and the mean value of the impulses are equal (that is the net current flow in the galvanometer branch is zero) so that if the impulse frequency is sufficiently high and the galvanometer has a linear response it will not be deflected. When the bridge-network is unbalanced, however, the galvanometer will deflect to an extent proportional to the difference between the steady current and the mean value of the current impulses, that is, to an extent proportional to the net current flow in the galvanometer branch.

The condition for zero deflection, or balance, was given by Maxwell as:

$$n_b = \frac{Q}{CR(P+S)}$$

where C is the condenser capacity, P, Q, R, are the resistances of the arms of the Wheatstone bridge, and $n_b$ is the frequency of the commutator, and S is the resistance of the network.

At any other frequency $n_1$ the next galvanometer current is:

$$i_{g1} = K\left(1 - \frac{n_1}{n_b}\right)$$

where K is a constant dependent only upon the circuit constants.

It will be clear therefore that the net galvanometer current at $n_b$ is zero and that at any other value $n_1$ it is $i_{g1}$. The value of the net galvanometer current is therefore solely dependent upon the frequency of the commutator. Moreover the range of the galvanometer deflections may be arbitrarily selected to indicate any desired range of frequency $n_b$ to $n_1$ in which $n_1$ is greater or less than $n_b$.

A description of this method with a diagram of the bridge-network is to be found on pages 59–60 of "Electrical Measurements and Measuring Instruments" by E. W. Golding (3rd edition, 1942, by Sir Isaac Pitman & Sons Ltd.)

Hereinafter throughout the specification the modified Wheatstone bridge described above comprising the three resistance arms, the condenser arm and the commutator associated therewith will be referred to as a "Maxwell bridge-network." Furthermore the points of the network across which the galvanometer would normally be connected will be referred to as the "output points" of the network, although during balance of the bridge there is no net current flow from one to the other of said points.

According to one aspect of the present invention a method of speed-governing is characterised in that a source of direct current is adapted to be applied to a Maxwell bridge-network the condenser of which is alternately charged therefrom and discharged with a frequency proportional to the speed to be governed, and the output points of the network are connected to electrical means which is brought into operation upon a difference between the value of the steady current and the mean value of the current impulses being established consequent upon the speed to be governed departing from a datum value corresponding to a state of balance in the bridge, said means being effective automatically to adjust the speed to be governed to restore the datum value thereof and re-establish balance in the bridge-network.

A specific embodiment of the present invention will now be described by way of example with reference to the accompanying drawings whereof:

The single figure is a circuit diagram of a control for regulating the speed of a gas-turbine power-plant by varying the quantity of fuel passing thereto.

Referring to the figure: the compressor 8 of the power-plant 9 is directly coupled to an alternator 10 so that the speed of the latter is proportional to the speed of the former. As a consequence the frequency of the current generated by the alternator is directly related to the speed of the compressor. The output of the alternator is conveyed by conductors 11 to a polarised relay 12 whose armature 13 is thereby made to vibrate alternately to engage a pair of contacts 14, 15. When the armature 13 engages contact 15 a condenser 16 is charged from a source of direct current 17 which is applied to the input points of a Maxwell bridge-network, the current source 17 being connected with these points by conductors 18. The Maxwell bridge-network comprises three arms having the resistances 19, 20 and 21 inserted therein and a condenser arm having the condenser 16 inserted therein. The input points of the bridge-network are shown at $a$ and $b$ whilst the output points are at $c$ and $d$. As indicated, when armature 13 engages contact 15 condenser 16 is charged from source 17—when armature 13 engages contact 14 the condenser is discharged. It is preferred that the source of direct current 17 be a rectifier which is supplied with alternating current from the compressor-driven alternator 10 through conductors 22.

The output points $c$ and $d$ of the bridge-network are connected through a low pass-filter of known form diagrammatically indicated by the box 23 which encloses the components of the filter and to a load resistance 24a, 24b associated with an amplifier unit. The function of the low-pass filter 23 is to eliminate the pulsations in the current delivered from the bridge-network so that these pulsations are not applied to the load resistance 24a, 24b—as would otherwise be the case whether the bridge was balanced or not. As a consequence the potential-difference prevailing across the load-resistance is proportional to the net current flowing from one output point of the bridge-network to the other. This, as indicated above, is proportional to the difference between the prevailing frequency with which the condenser is being charged and discharged and the frequency with which it should be charged and discharged in order to produce balance of the bridge.

The amplifier unit which is generally indicated as a whole by the box 25 incorporates a pair of thermionic valves 26, the control grids 27 of which are connected by conductors 28 to one end of the load-resistance 24a, 24b while the cathodes 29 of the valves are both connected to the centre point of the load-resistance by a conductor 30. The self-biasing resistance 31 associated with each valve is placed between the cathode 29 and the common connection 30 to the load-resistance 24a, 24b. The anodes 32 of the valve are respectively connected to one end of the coil of a polarised relay 33 and the high-tension supply for the amplifier unit is fed in at points 34, one of which connects to the centre point of the coil of the polarised relay. The high-tension supply may be obtained as shown in Figure 1 from the unit 17, the low-tension supply being provided by a battery 40 in known manner.

The polarised relay 33 controls the operation and direction of rotation of a reversible electric motor 35 which is driven from a battery 51. The motor is connected to a valve 36 as at 39 and is capable of adjusting the setting of the valve which regulates the quantity of fuel passing from a pump 37, to the power-plant by a pipe 38. For instance the motor 35 may be connected with the valve 36 through a worm and worm-wheel drive and a linkage which connects the worm-wheel with the valve. The electric motor 35 may be provided with a split field-winding and there is preferably associated with it an automatic brake and clutch of known construction in order to prevent hunting of the apparatus.

As has been indicated in the opening paragraphs of the specification, the frequency with which the condenser 16 is charged and discharged in order to produce balance in the Maxwell bridge-network is arbitrarily determined by the values for the capacity of the condenser 16 and for the resistances 19, 20 and 21. Since this frequency depends upon the frequency of the current generated by the compressor-driven alternator 10 (and hence on the speed of the power-plant) the condenser and resistances are selected to produce balance in the bridge-network at a preselected datum speed of the power-plant.

Whilst this datum speed is maintained by the power-plant the bridge-network is balanced, there is therefore no potential difference across the load resistance 24, and the amplifier unit 25 is inoperative. Consequently the polarised relay 33 associated with said unit remains open so that the fuel-valve-setting motor 35 is inoperative. The setting of the fuel-valve 36 is then such that the quantity of fuel passing to the power-plant will maintain the latter at the datum speed value.

When the power-plant departs from the datum speed value the condenser 16 is charged and discharged with a frequency greater or less than that required to maintain balance of the Maxwell bridge-network. Accordingly a steady potential-difference is produced across the load-resistance 24a, 24b and one or the other of the thermionic valves 26a, 26b passes a greater current than is passed by the other. The current from the amplifier unit 25 energises the polarised relay 33 associated therewith in one sense or the other to bring the fuel-valve-setting motor 35 into operation in one direction or the other to adjust the fuel-valve 36. The latter will be moved to increase or decrease the quantity of fuel passing to the power-plant depending upon whether the latter has decreased or increased its speed relative to the datum value. As a consequence the datum speed will be re-established.

It is desirable not only to be able to maintain the power-plant automatically at a datum speed as described above but to be capable of varying the value of the datum speed at which the power plane is automatically maintained. This is provided for by varying the value of the resistance 21 of the bridge-network. By adjusting the value of this resistance the frequency with which the condenser 16 should be charged and discharged in order to maintain balance in the bridge-network is altered. The speed of the power-plant is therefore changed by the fuel-valve-setting motor 35 adjusting the fuel-valve 36 as described above so that the newly selected datum speed is established. At this speed the condenser 16 will be charged and discharged with a frequency which produces balance of the bridge network.

By providing a resistance 52 of fixed value in series with the adjustable resistance 21 (in which case the resistance arm comprises said two resistances) it is possible for the datum speed range to be made effective where desired within a wide range of power-plant speeds. That is the range of control effected by the adjustable resistance 21 may be applied between any two prescribed speeds of operation of the power-plant by a suitable selection for the value of the fixed resistance 52. For instance, the adjustable resistance 21 may produce a speed adjustment of 1000 R. P. M. and this may take place at any point between a speed range of 10,000 to 20,000 R. P. M. (say as 12—13,000 R. P. M. or 17—18,000 R. P. M.) depending upon the value of the fixed resistance.

I claim:

1. A device for governing the speed of a gas-turbine engine comprising a bridge network having three resistance arms and a condenser arm, a current source from which the condenser is charged, a source of direct current applied to the input points of the network, means driven by the engine for alternately connecting the current source with the condenser to charge the condenser and for discharging the condenser, the resistances of the resistance arms and the capacity of the condenser being selected so that the bridge network is balanced when the engine speed is at a datum value, electronic response and actuating means connected with the output points of the network and operated by current from the bridge when the latter is unbalanced following on a departure of the engine speed from said datum value, relay means actuated by the electronic response and actuating means, engine-speed regulating means actuated by said electronic means to return the engine speed to said datum value and thereby to re-establish balance in the bridge network and means for varying the resistance value of an arm of the network so that the datum value of engine speed at which the network is balanced is variable.

2. A device according to claim 1 in which the resistance arm having the variable resistance comprises a changeable, non-variable resistance and a variable resistance in series therewith.

PETER FORTESCUE.

REFERENCES CITED

The following references are of record in the file of this patent:

UNITED STATES PATENTS

| Number | Name | Date |
|---|---|---|
| 1,604,163 | Herman | Oct. 26, 1926 |
| 1,611,223 | Nyquist | Dec. 21, 1926 |
| 1,833,048 | Cutler | Nov. 24, 1931 |
| 2,124,725 | Williams et al. | July 26, 1938 |
| 2,151,127 | Logan et al. | Mar. 21, 1939 |
| 2,275,317 | Ryder | Mar. 3, 1942 |
| 2,431,501 | Phillips | Nov. 25, 1947 |

FOREIGN PATENTS

| Number | Country | Date |
|---|---|---|
| 380,586 | Germany | Sept. 10, 1923 |